United States Patent
Matsumoto et al.

(10) Patent No.: US 7,369,673 B2
(45) Date of Patent: May 6, 2008

(54) SPEAKER SUPPORTING DEVICE AND ELECTRONIC DEVICE COMPRISING THIS SPEAKER SUPPORTING DEVICE

(75) Inventors: Yoshiya Matsumoto, Kawasaki (JP); Kouji Hirata, Kato-gun (JP); Yoshito Fukata, Kato-gun (JP); Katsushige Kohri, Kato-gun (JP)

(73) Assignees: Fujitsu Limited, Kawasaki (JP); NTT DoCoMo, Inc, Tokyo (JP)

( * ) Notice: Subject to any disclaimer, the term of this patent is extended or adjusted under 35 U.S.C. 154(b) by 415 days.

(21) Appl. No.: 10/852,131

(22) Filed: May 25, 2004

(65) Prior Publication Data
US 2004/0253977 A1    Dec. 16, 2004

(30) Foreign Application Priority Data
Jun. 13, 2003   (JP)   ............................. 2003-169821

(51) Int. Cl.
*H04R 25/00*   (2006.01)
(52) U.S. Cl. .................. 381/386; 381/345; 381/370
(58) Field of Classification Search .............. 381/386, 381/150, 388, 394, 333, 360, 395, 87, 189, 381/409, 332, 338, 345, 349, 350, 351, 353, 381/354, 162, 370; 455/569.1, 350, 575.1; 379/430, 433.01, 433.02
See application file for complete search history.

(56) References Cited

U.S. PATENT DOCUMENTS

| | | | |
|---|---|---|---|
| 6,324,412 B1 * | 11/2001 | Alen et al. | 455/567 |
| 6,411,719 B1 * | 6/2002 | Moster et al. | 381/345 |
| 6,621,910 B1 * | 9/2003 | Weckstrom et al. | 381/351 |
| 7,263,387 B2 * | 8/2007 | Ho et al. | 455/569.1 |
| 2004/0165739 A1 * | 8/2004 | Akens et al. | 381/189 |
| 2004/0170291 A1 * | 9/2004 | Eaton | 381/334 |
| 2004/0252857 A1 * | 12/2004 | Lewis | 381/355 |

FOREIGN PATENT DOCUMENTS

| | | |
|---|---|---|
| JP | 2001-127862 | 5/2001 |
| JP | 2002-10387 | 1/2002 |

* cited by examiner

*Primary Examiner*—Huyen Le
(74) *Attorney, Agent, or Firm*—Kratz, Quintos & Hanson, LLP

(57) ABSTRACT

A speaker supporting structure, which includes a speaker supporting device with improved assembly characteristics, and an electronic device comprising this speaker supporting device. The speaker supporting device is a structure which supports a speaker mounted in a case, and comprises a main body part which covers a wiring board disposed inside the case, and a mounting part which is formed in this main body part, and on which the speaker is mounted.

10 Claims, 8 Drawing Sheets

SPEAKER SUPPORTING DEVICE AND ELECTRONIC DEVICE COMPRISING THIS SPEAKER SUPPORTING DEVICE

BACKGROUND OF THE INVENTION

1. Field of the Invention

The present invention relates to a speaker supporting device suitable for use in various types of electronic devices having built-in speakers, such as mobile telephones, PHS (personal handyphone systems), other information mobile terminals and the like, and an electronic device comprising this speaker supporting device, and more particularly relates to a speaker supporting structure and assembly structure of an electronic device.

2. Description of the Related Art

Besides a speaker as a receiver that is used to reproduce communications sound, a speaker that is used to reproduce calling sounds and the like is disposed in a mobile telephone. These speakers are reduced in size and weight, and are mounted on wiring boards or on case internal members together with other electronic parts and disposed in the vicinity of respective sound emission holes in the rear side case and front surface side case.

Prior patent references relating to such speaker supporting structures include Japanese Patent Application Laid-Open No. 2002-10387 and Japanese Patent Application Laid-Open No. 2001-127862.

In FIG. 5 and the description of this figure in Japanese Patent Application Laid-Open No. 2002-10387, a structure in which a board on which electronic parts and the like functioning as control parts used to control the driving of the speaker is disposed between a shielding case and an LCD holder, and the speaker is fastened between the shielding case and a rear case while ensuring a front air chamber as a result of the shielding case being pressed by the board and an annular cushion disposed on the outer circumferential part of the speaker being compressed due to the screw fastening of the front case and rear case, is disclosed as a speaker device for mobile telephones and the like.

Furthermore, in Japanese Patent Application Laid-Open No. 2001-127862, a structure in which the speaker is held by a speaker holding member supported on a shielding case which is installed so that this shielding case straddles a printed board is disclosed as a speaker structure which facilitates the fastening and electrical wiring of the speaker.

Speakers that are mounted in mobile telephones are compact speakers with a diameter of approximately 15 mm, and do not have a structure in which the speaker itself is screw-fastened. Instead, as is disclosed in the above-mentioned patent references and the like, a simple supporting structure in which the speaker is sandwiched between other members, or in which the speaker is fastened to a specified member by means of an adhesive tape or the like, is employed.

Seen from the standpoint of the speaker alone, such supporting structures are extremely simple structures. However, in electronic devices such as mobile telephones or the like in which the mounting density of electronic parts is high and the speaker must be installed in a constricted space, the attachment of the speaker causes a deterioration in the assembly characteristics of such electronic devices such as mobile telephones or the like. Such a problem is not disclosed in the above-mentioned patent references, and cannot be solved by the techniques disclosed in these patent references.

SUMMARY OF THE INVENTION

The present invention relates to a speaker supporting structure and its object is to provide a speaker supporting device and an electronic device in which the assembly characteristics are improved.

In order to achieve the above-mentioned object, a speaker supporting device of the present invention is a speaker supporting device which supports a speaker that is mounted in a case, and has a construction comprising a main body part which covers a wiring board disposed inside this case, and a mounting part which is formed in this main body part, and on which the above-mentioned speaker is mounted.

If such a construction is used, the speaker is integrated with the main body part as a result of being mounted on the mounting part of the main body part. This mounting of the speaker on the main body part can be performed separately from the formation of the wiring board or mounting of parts, and the speaker can be mounted together with the main body part by disposing the main body part on the wiring board. The wiring board on which the main body part is disposed is covered by the main body part, so that the mounted parts on the covered portion are protected.

In order to achieve the above-mentioned object, a construction may also be used in which the above-mentioned main body part is a shielding member. If such a construction is used, a shielding function can be obtained by causing all or part of the wiring board to be covered by the main body part that supports the speaker, so that a shielding case becomes unnecessary, thus reducing the number of parts required.

In order to achieve the above-mentioned object, a construction may also be used in which the above-mentioned main body part comprises a resonant space that is caused to communicate with the rear part of the above-mentioned speaker. If such a construction is used, the rear output of the speaker can be caused to resonate in the resonant space, thus contributing to an increase in the level of the sound output.

In order to achieve the above-mentioned object, a construction may also be used in which a vibrator is mounted on the above-mentioned main body part. If such a construction is used, the speaker and vibrator can be integrated through the intermediaryship of the main body part by mounting this vibrator on the main body part, so that the speaker and vibrator can easily be mounted in specified positions inside the case by means of the main body part on which the speaker and vibrator are mounted.

In order achieve the above-mentioned object, an electronic device of the present invention has a construction comprising the above-mentioned speaker supporting device. If such a construction is used, the speaker can be mounted inside the case together with the main body part, so that the assembly characteristics of the electronic device can be improved.

Furthermore, the special features and advantages of the present invention may be described as follows:

(1) In a speaker supporting device of the present invention, since the speaker is mounted on a mounting part and installed inside the case, the assembly characteristics of various types of devices in which the speaker is installed can be improved.

(2) In a speaker supporting device of the present invention, if a construction is used in which the main body part is a shielding member, all or part of the wiring board can be shielded by the speaker supporting device, so that the number of parts required and the number of steps required for assembly can be reduced.

(3) In a speaker supporting device of the present invention, if a construction is used in which a resonant space is provided in the main body part, the space inside the case can be effectively utilized, and the speaker output can be increased.

(4) In a speaker supporting device of the present invention, if a construction is used in which a vibrator is mounted on the main body part, the number of steps required for assembly can be reduced.

(5) In an electronic device of the present invention, by providing the above-mentioned speaker supporting device, the assembly characteristics of the electronic device can be improved.

BRIEF DESCRIPTION OF THE DRAWINGS

Furthermore, other objects, features and advantages of the present invention will become much clearer by referring to the accompanying drawings and respective embodiments.

DESCRIPTION OF THE PREFERRED EMBODIMENTS

Figure 1:
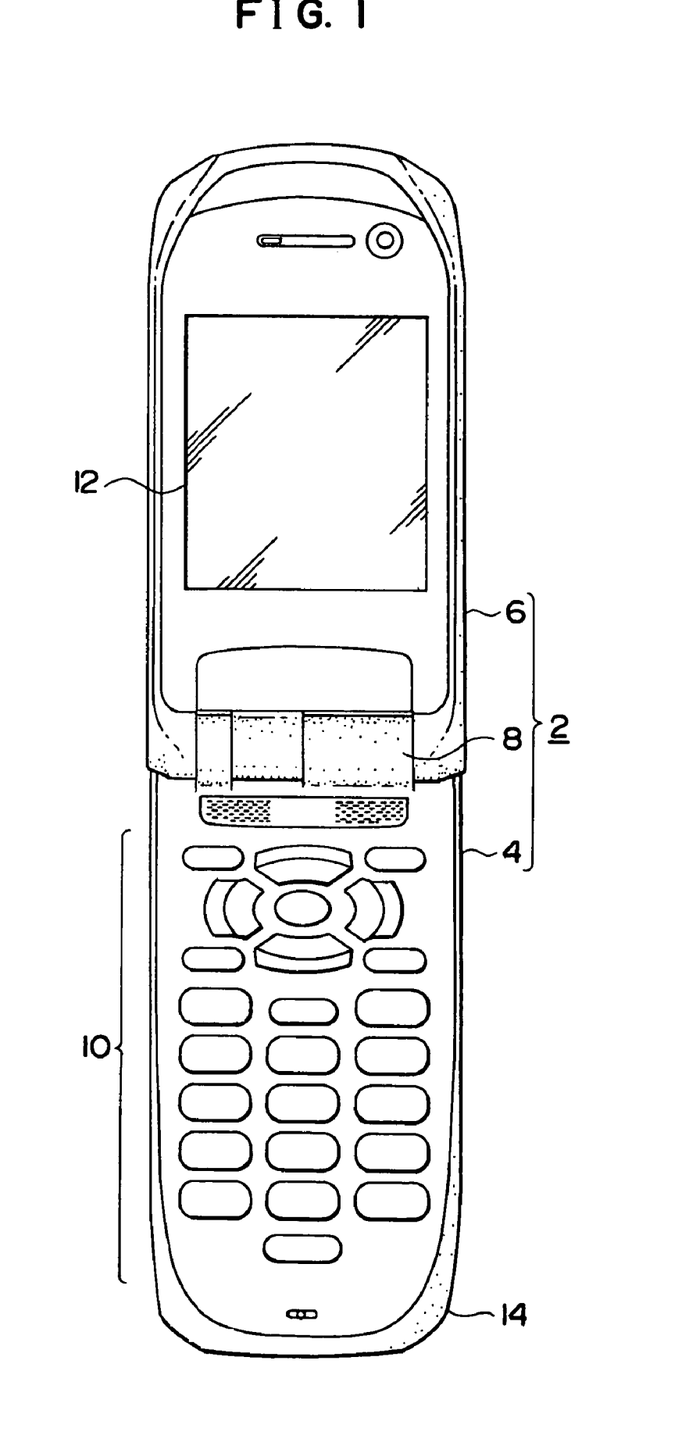
FIG. 1 is a front view showing the open state of a mobile telephone constituting an embodiment of the present invention.

An embodiment of the speaker supporting device and electronic device of the present invention will be described with reference to FIGS. 1 and 2. FIG. 1 is a front view showing the open state of a mobile telephone constituting an embodiment of the present invention, and FIG. 2 is an exploded perspective view showing the operating part.

The mobile telephone 2 has a folding structure, and is constructed such that an operating part 4 and a display part 6 can be folded by means of a hinge part 8. A plurality of key buttons 10 such as character keys or the like are disposed in the operating part 4, and an LCD display 12 is disposed in the display part 6.

Figure 2:
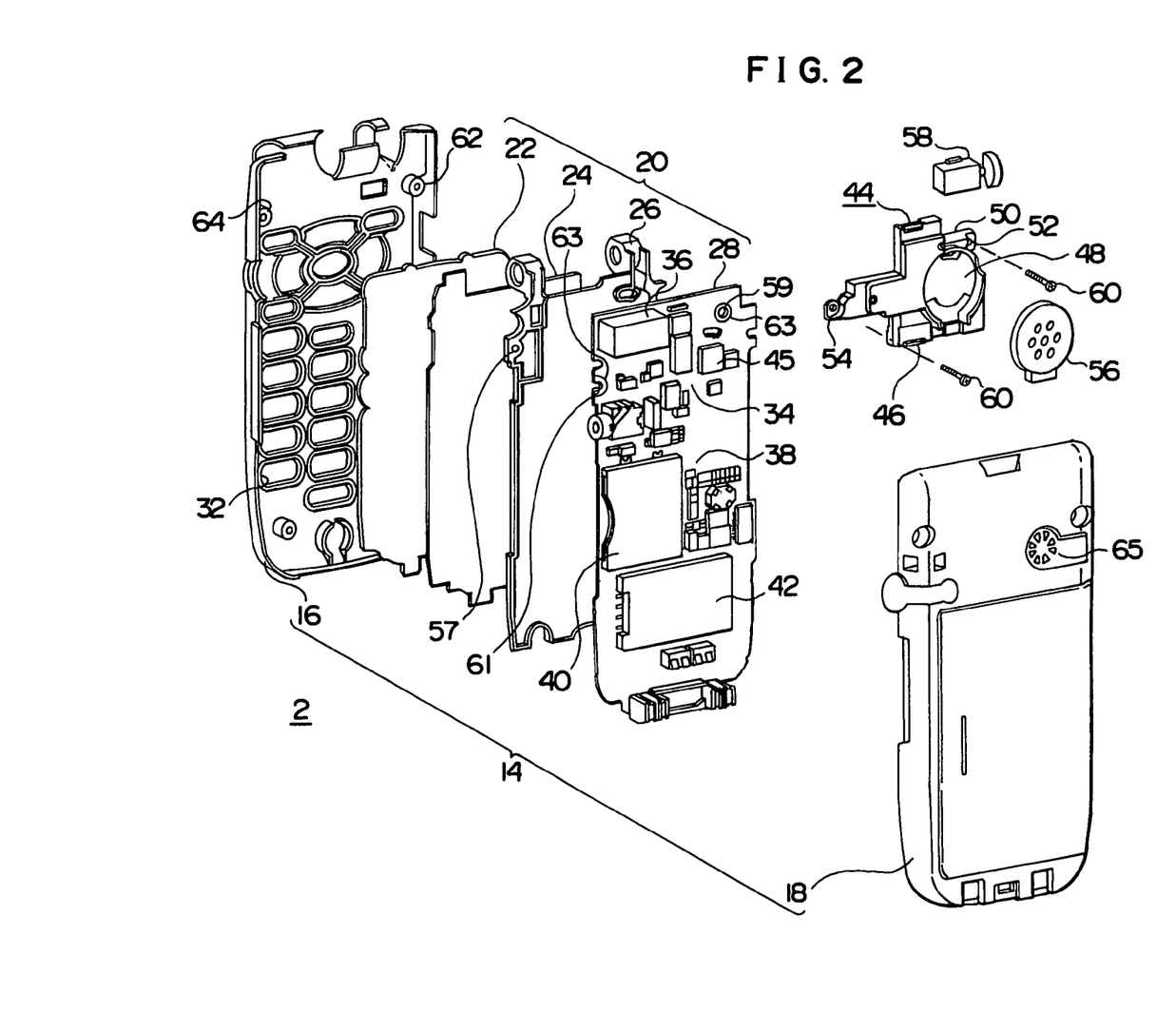
FIG. 2 is an exploded perspective view showing the operating part.

In this mobile telephone 2, as is shown in FIG. 2, the case 14 on the side of the operating part 4 is constructed from a front surface case 16 and a back case 18. For example, synthetic resin molded bodies can be used as this front surface case 16 and back case 18. Accordingly, the case 14 is a body formed by joining the front surface case 16 and the back case 18. A key pad 22, dome key 24, key case 26 and wiring board 28 are contained in this case 14 as case internal members 20 in that order from the side of the front surface case 16. The key pad 22 constitutes key buttons 10 that are exposed in respective key windows 32 in the front surface case 16. The dome key 24 is a switch which is opened and closed by the pressing and release of the key buttons 10. The key case 26 constitutes a partition wall that protects the dome key 24. A wireless part 34, antenna 36, control part 38, memory card attachment and detachment part 40, SIM card attachment and detachment part 42 and various other types of circuit parts constituting functional parts of the mobile telephone 2 are mounted on the wiring board 28.

Furthermore, as an embodiment of the speaker supporting device, a speaker holder 44 is installed, and this speaker holder 44 comprises a speaker mounting part 48, vibrator mounting part 50 and fastening parts 52 and 54 on a holder main body part 46 used as a supporting main body part. A speaker 56 is mounted on the speaker mounting part 48, and a vibrator 58 is mounted on the vibrator mounting part 50. After the speaker 56 and vibrator 58 have been attached, screws 60 (for example) are used for the fastening of the speaker holder 44, the wiring board 28, key case 26 and the like are sandwiched between the front surface case 16 and speaker holder 44, and the speaker holder 44 is fastened to the front surface case 16 by fastening screws 60 that are passed through the speaker holder 44 to fastening parts 62 and 64 on the front surface case 16. The front surface case 16 on which the case internal members 20 and speaker holder 44 have thus been mounted is closed by the attachment of the back case 18. Accordingly, a sound emission hole 65 comprising a plurality of small holes is formed in the back case 18 in a position corresponding to the front surface of the speaker 56 mounted on the speaker mounting part 48 of the speaker holder 44. The voice output emitted from the speaker 56 is emitted to the outside of the case 14 from the sound emission hole 65.

In this case, through-hole parts 57 are formed in the key case 26, and a through-hole part 59 and cut-out part 61 are formed in the wiring board 28, for the fastening of the screws 60, and grounding conductors 63 are formed adjacent to the through-hole part 59, cut-out part 61 and the like. The speaker holder 44 covers the wiring board 28 so that various types of mounted parts 45 on the wiring board 28 (the wireless part 34 in the present example) are covered by the speaker holder 44; furthermore, these parts are electrically connected to the grounding conductors 63 of the wiring board 28 and are thus set at the same potential, and this potential is maintained by the fastening of the screws 60. Accordingly, the speaker holder 44 functions as protective means for the mounted parts 45, and as a shielding case for the wireless part 34.

Figure 3:
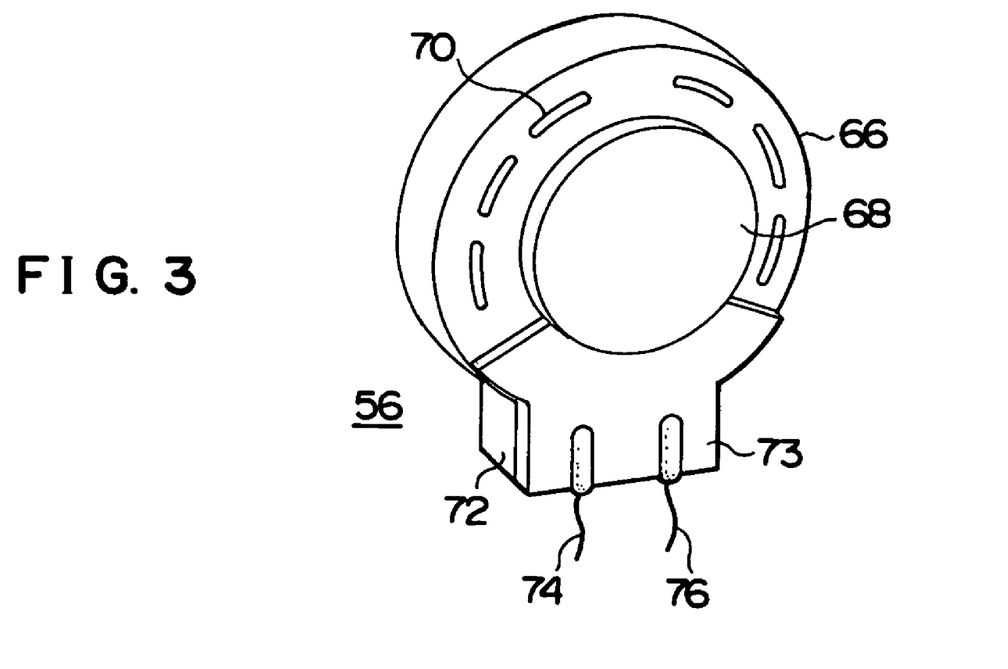
FIG. 3 is a perspective view showing the speaker as seen from the rear side.

Next, the speaker 56 will be described with reference to FIG. 3. FIG. 3 shows the speaker 56 as seen from the rear side.

The speaker 56 comprises a housing part 66 which constitutes a flattened cylindrical body; a circular speaker unit 68 protrudes from the rear part of this housing part 66, and a plurality of oval sound holes 70 which are used to extract the rear output are formed in an annular configuration in the rear part of the housing part 66 surrounding this speaker unit 68. Furthermore, a terminal plate 73 is attached to a terminal part 72 that is caused to protrude from the housing part 66, and lead wires 74 and 76 are soldered to the speaker unit 68 and led out from the terminal plate 73.

Figure 4:
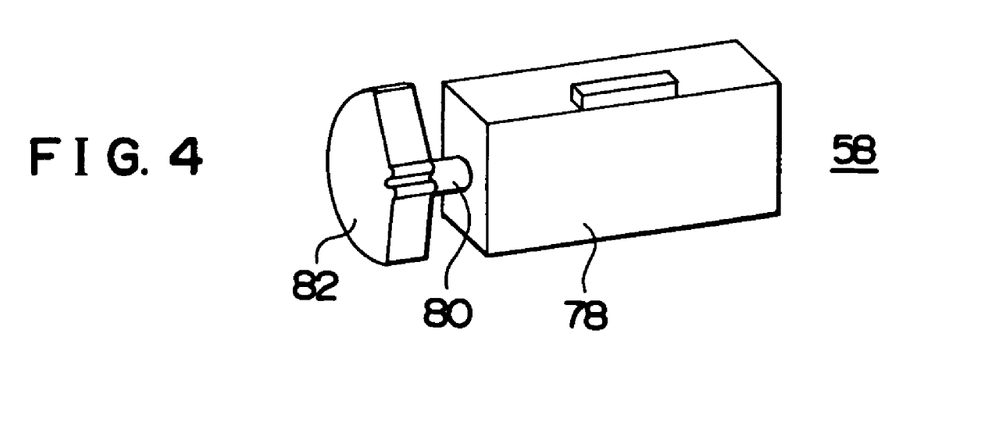
FIG. 4 is a perspective view showing the external appearance of the vibrator.

Next, the vibrator 58 will be described with reference to FIG. 4. FIG. 4 shows the external appearance of the vibrator 58.

In the vibrator 58, for example, a motor is incorporated in a housing part 78 which has a rectangular solid shape, and a fan-shaped eccentric body 82 is attached to a rotating shaft 80 that is led out from the end surface portion of this housing part 78. Vibration is generated by the rotation of the eccentric body 82.

Figure 5:
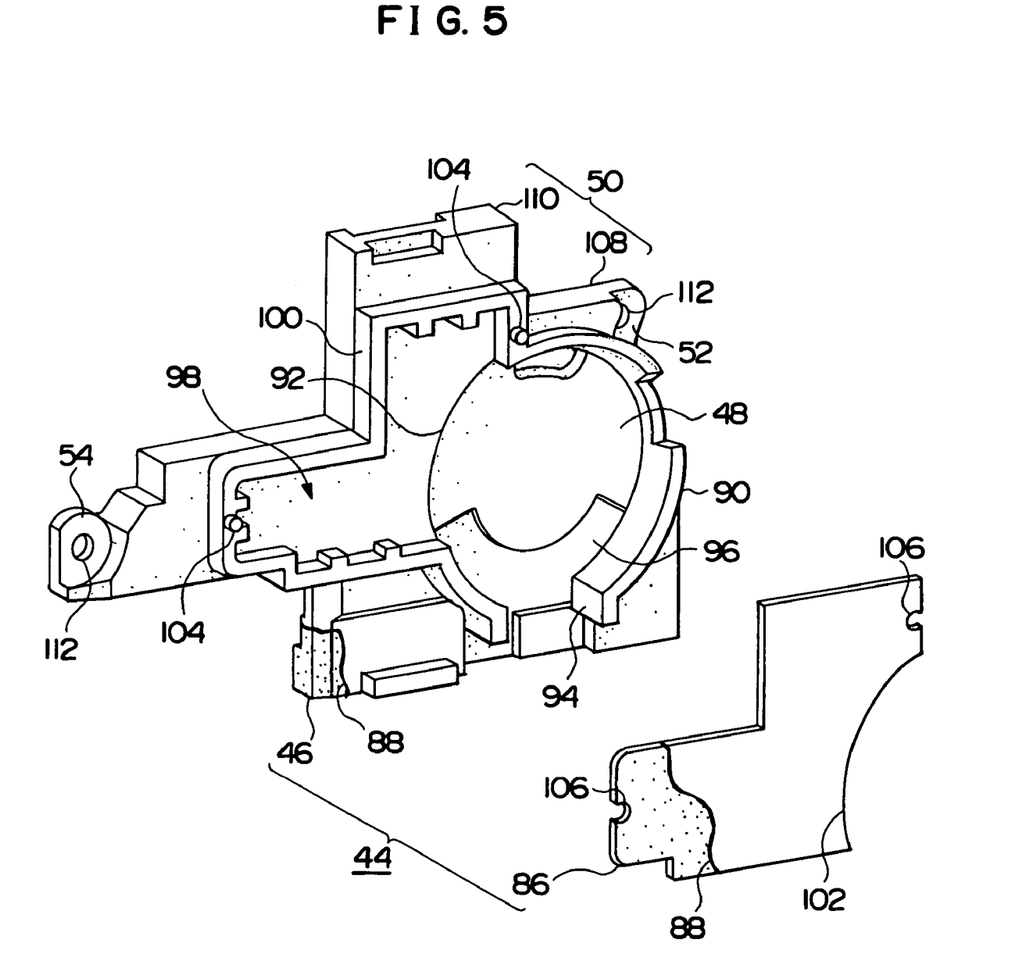
FIG. 5 is an exploded perspective view showing the speaker holder.
Figure 6:
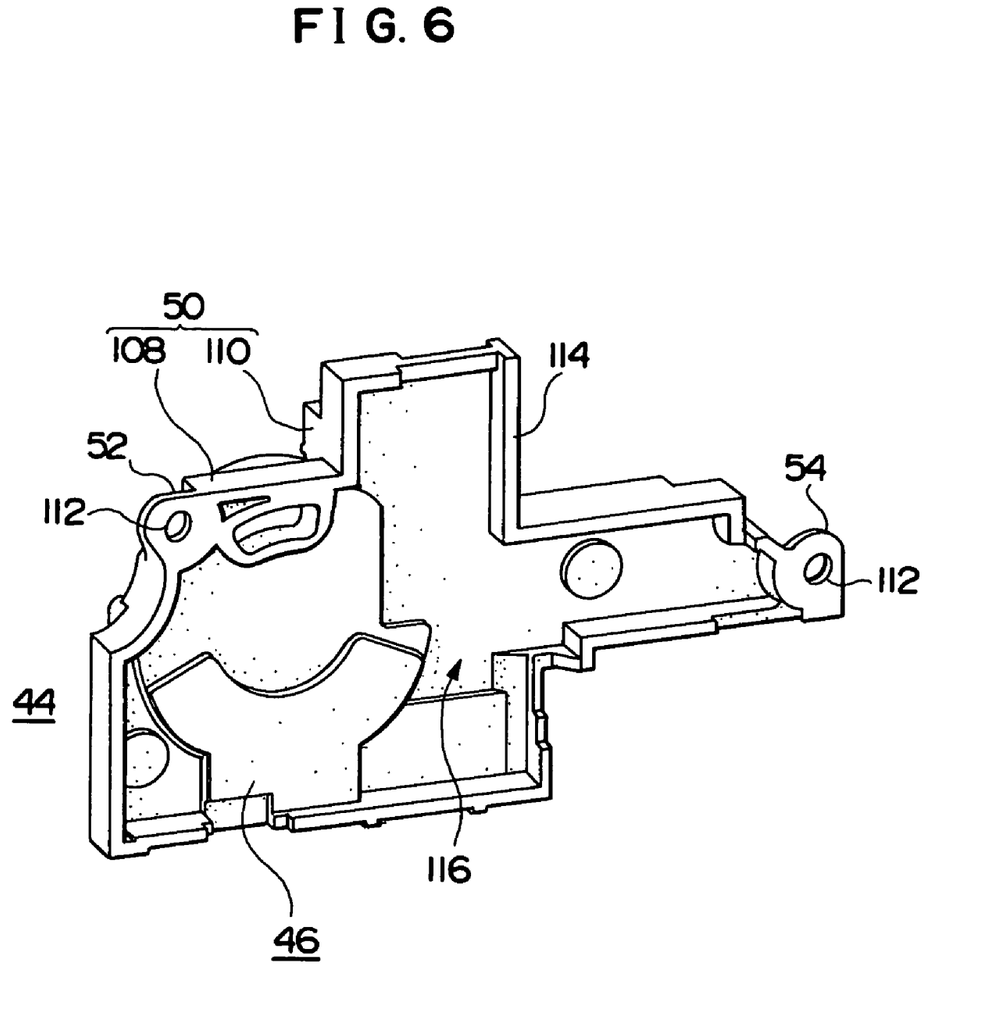
FIG. 6 is a perspective view showing the speaker holder as seen from the rear side.

Next, the speaker holder 44 that holds the speaker 56 will be described with reference to FIGS. 5 and 6. FIG. 5 is a partially cut-away exploded perspective view of the speaker holder 44, and FIG. 6 is a perspective view which shows the speaker holder 44 as seen from the rear side.

In the speaker holder 44, a cover part 86 is disposed on a holder main body part 46. For example, this holder main body part 46 and cover part 86 are synthetic resin molded bodies, and conductive layers 88 are formed on the surface portions of these part as indicated by the portions that are partially cut away. These conductive layers 88 are metal films that are formed by vacuum deposition of a metal, plating, coating with a metal paint or the like, and endow the speaker holder 44 with a shielding function.

In this speaker holder 44, a first surrounding wall 90 which surrounds a portion of the circumferential surface part of the speaker 56 is formed on the speaker mounting part 48 of the holder main body part 46, and a recessed part 92 which is used to engage the housing part 66 is also formed thereon; furthermore, a passage part 94 which allows the terminal part 72 and terminal plate 73 of the housing part 66 to pass through is formed in the surrounding wall 90. Moreover, a recessed part 96 which corresponds to the terminal plate 73 is formed in the speaker mounting part 48, and the terminal plate 73 is engaged in this recessed part 96.

Furthermore, a resonant space part 98 which expands the rear space of the speaker 56 is formed in this holder main body part 46; this resonant space 98 is a closed-off space which is constructed from a surround wall part 100 that is continuous with the surrounding wall 90, and a cover part 86 that closes of this surrounding wall part 100. A circular-arc-form cut-out part 102 which corresponds to the shape of the speaker mounting part 48, i. e., to the circumferential surface shape of the housing part 66 of the speaker 56, is formed in the cover part 86, and this cut-out part 102 and the housing part 66 of the speaker 56 are joined. Furthermore, for example, as a construction for positioning and engaging this cover part 86 and the surrounding wall part 100, a plurality of cylindrical engaging projections 104 are formed in the top part of the surrounding wall part 100, and a plurality of circular engaging recesses 106 into which these engaging projections 104 are inserted are formed in the cover part 86. The cover part 86 and surrounding wall part 100 are positioned and fastened together by the engagement of these engaging projections 104 and engaging recesses 106, and the top part of the surrounding wall 100 and the cover part 86 are sealed by an adhesive material such as an adhesive tape or the like.

Furthermore, in this speaker holder 44, the vibrator mounting part 50 formed on the side of the upper part of the speaker mounting part 48 is constructed by fastening surface parts 108 and 110 which fasten the housing part 78 of the mounted vibrator 58. The vibrator 58 is firmly fastened to the fastening surface parts 108 and 110 by (for example) an adhesive material such as an adhesive tape or the like used as fastening means, and is thus integrated with the speaker holder 44.

Furthermore, through-holes 112 which are used to allow the passage of screws 60 are formed in the fastening parts 52 and 54 that fasten this speaker holder 44 to the front surface case 16 and the like. The screws 60, which are conductors, are passed through the respective through-holes 112 of the fastening parts 52 and 54, the through-hole parts 57 of the key case 26, and the through-hole part 59 and cut-out part 61 of the wiring board 28, and are fastened to the fastening parts 62 and 64 of the front surface case 16. As a result of this fastening, the conductive layer 88 (constituting a surface conductor) of the speaker holder 44 is electrically connected to the wiring board 28 and the grounding conductors 63 of the key case 26, so that the speaker holder 44 is set at the same potential as the wiring board 28 and the grounding conductors 63 of the key case 26.

Furthermore, in this speaker holder 44, a surrounding wall part 114 which rises from the peripheral edge part of the holder main body part 46 is formed on the rear side of the holder main body part 46, so that a space part 116 that is surrounded by this surrounding wall part 114 is formed. In this embodiment, the holder main body part 46 has a projected area that covers the area of the wireless part 34 on the wiring board 28, and has a planar shape that encompasses this area.

Figure 7:
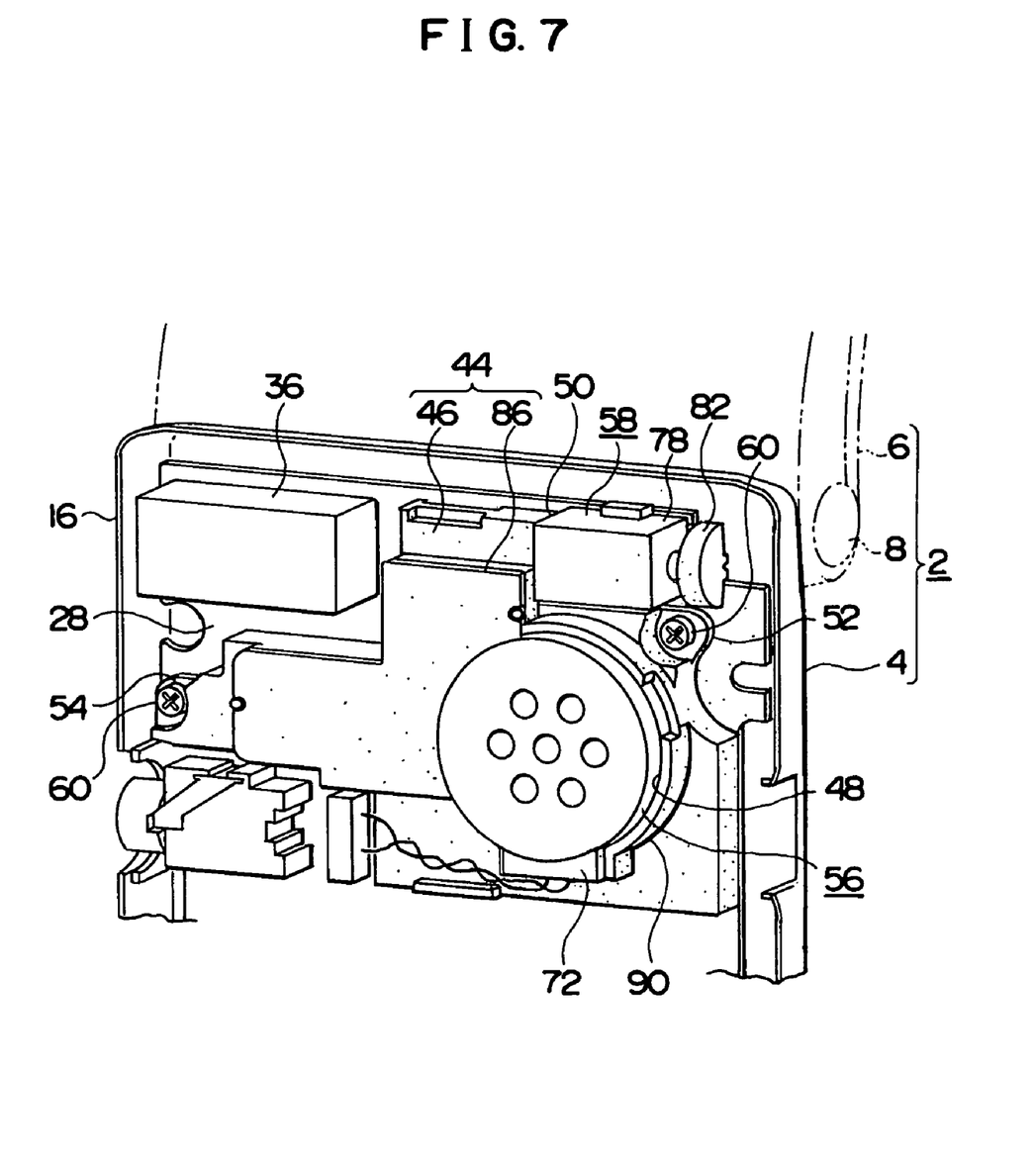
FIG. 7 is a perspective view showing a portion of the construction on the side of the front surface case on which the speaker holder is mounted.
Figure 8:
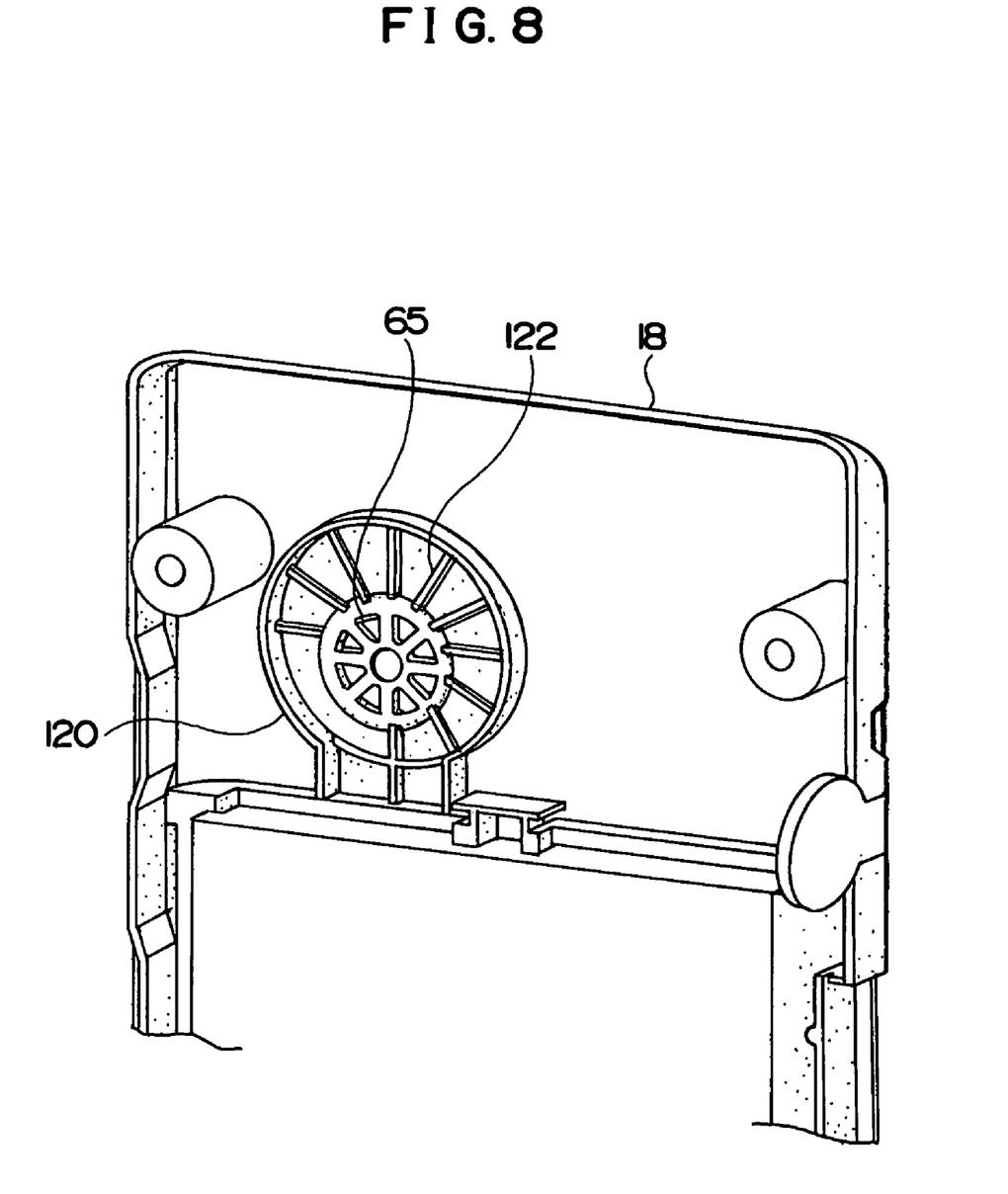
FIG. 8 is a perspective view showing a portion of the construction on the inside of the back case.

Next, the mounting structure using the speaker holder 44 will be described with reference to FIGS. 7, 8 and 9. FIG. 7 is a perspective view showing a portion of the construction on the side of the front surface case 16 on which the speaker holder 44 is mounted, FIG. 8 is a perspective view showing a portion of the construction on the inside of the back case 18 that covers the rear side of the front surface case 16, and FIG. 9 is a sectional view showing a schematic outline of the internal structure of the mobile telephone, with this structure cut along the portion where the speaker holder 44 is installed.

After the speaker holder 44 in which the speaker 56 has been mounted on the speaker mounting part 48 and the vibrator 58 has been mounted on the vibrator mounting part 50 is disposed so that this speaker holder 44 is superimposed on the wiring board 28, this speaker holder 44 is accommodated in the front surface case 16 so that the speaker holder 44 is superimposed on the key pad 22, dome key 24 and key case 26, and is fastened to the front surface case 16 by inserting screws 60 into the respective fastening parts 52 and 54.

A second surrounding wall 120 which has the same shape as the surrounding wall 90 of the speaker holder 44 mounted on the front surface case 16 is formed on the inside surface side of the back case 18 that closes off the front surface case 16 in a position that matches the position of the surrounding wall 90, and a plurality of sound emission holes 65 are formed in the portion surrounded by this surrounding wall 120. A plurality of ribs 122 are formed in the radial direction of the sound emission holes 65 with the sound emission holes 65 as the center, so that the sound emission holes 65 and surrounding wall 120 are reinforced. The surrounding walls 90 and 120 are joined with the top parts of these walls facing each other at the time of the specified joining of the front surface case 16 and back case 18.

Figure 9:
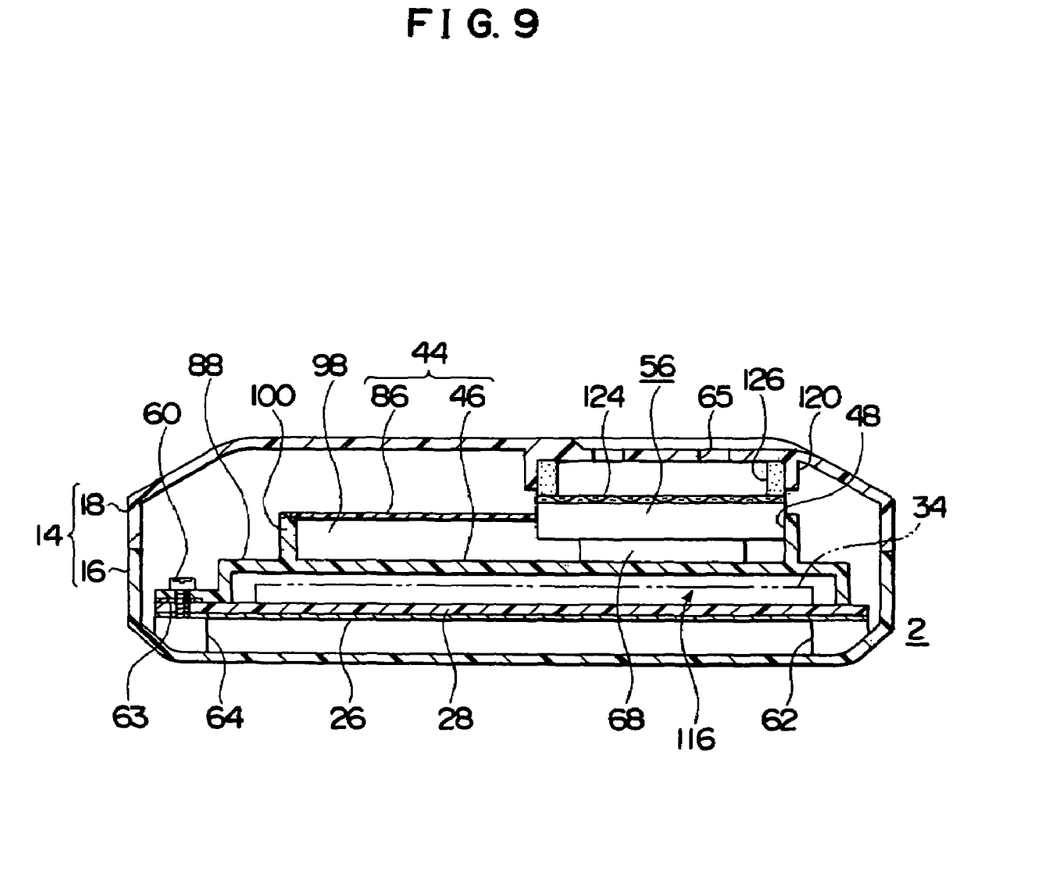
FIG. 9 is a sectional view showing a schematic outline of the internal structure of the mobile telephone, with this structure cut in a section along the portion of the speaker holder.

Furthermore, when the front surface case 16 and back case 18 are joined into one case 14, the front surface part of the speaker 56 mounted on the speaker holder 44 faces the sound emission holes 65 via the protective net 124 disposed on the back case 18 on the side of the surrounding wall 120 as shown in FIG. 9. The protective net 124 is attached to a supporting ring 126 comprising an elastic body, and the supporting ring 126 is fastened to the surrounding wall 120 by means of an adhesive material such as an adhesive tape or the like.

Furthermore, mounted parts constituting the wireless part 34 mounted on the wiring board 28 are accommodated in the space part 116 on the rear side of the speaker holder 44, so that this space part 116 functions as a shielding case for the wireless part 34. As was described above, the speaker holder 44 is converted into a conductor by the conductive layer 88, and is maintained at the same electrical potential as the grounding conductors 63 of the wiring board 28 as a result of being electrically connected to these grounding conductors 63. The electrical connection of the wiring board 28, key case 26 and the like with the speaker holder 44 is ensured by the firm fastening that is accomplished by means of the screws 60, which are conductors.

Furthermore, a resonant space 98 which has a sufficient volume by virtue of the height of the surrounding wall part 100 and an area that is sufficient to cover the wireless part 34 is formed in the upper surface portion of the holder main body part 46 of the speaker holder 44. The rear output of the speaker 56 is caused to resonate by this resonant space 98.

In the mobile telephone 2 of this embodiment, as was described above, since the speaker 56 is mounted on a speaker holder 44, the speaker 56, which is small and difficult to handle, can be installed inside the case 14 using the speaker holder 44, so that the assembly of the mobile telephone 2 can be accomplished quickly and easily. Furthermore, in this embodiment, a vibrator 58 is mounted on the speaker holder 44 in addition to the speaker 56, so that a plurality of parts can be assembled into a unit prior to the assembly of the mobile telephone 2; accordingly, this assembly can be accomplished even more quickly and easily.

Furthermore, in this mobile telephone 2, since a portion of the wiring board 28 is covered by the speaker holder 44, the wireless part 34 and mounted parts mounted on the wiring board 28 are protected in this embodiment.

Furthermore, since the shielding case that is constructed as an independent part in a conventional device is formed by the speaker holder 44 in this embodiment, the speaker holder 44 constitutes a shielding case, so that the number of parts required and the number of assembly steps required can be reduced. Moreover, the speaker 56 has a flattened shape, so that the installation of the speaker 56 does not cause any loss of the area or volume of the space part 116 that constitutes a shielding space. Accordingly, the parts that require shielding can be enveloped, and a volume that is sufficient to envelop the mounted parts can be ensured.

Furthermore, a resonant space 98 with a large volume is constructed in the speaker holder 44 by effectively utilizing the area that is used to cause the speaker holder 44 to function as a shielding case, so that an abundant acoustic output can be obtained.

Next, modifications of the embodiment of the speaker supporting device and electronic device of the present invention described above, as well as technical expansion items and the like, will be described below as examples.

(1) In the above-mentioned embodiment, a mobile telephone was described as an example. However, the speaker supporting device and electronic device of the present invention include mobile telephones, PHS, PDA (personal digital assistants), PC (personal computers), hand-held PC (hand-held personal computers), other information mobile terminals and the like, and can be applied to various types of mobile terminals comprising speakers such as digital cameras and the like. Thus, the present invention is not limited to the mobile telephone of the embodiment.

(2) In the above-mentioned embodiment, a case was described in which the speaker holder 44 was constructed from a synthetic resin molded body; however, this speaker holder 44 may also be constructed from a molded body comprising a metal plate.

(3) In the above-mentioned embodiment, a case was described in which the speaker holder 44 was disposed on the side of the operating part 4. However, the speaker holder 44 may also be disposed inside the case on the side of the display part 6.

(4) In the above-mentioned embodiment, a case was described in which a portion of the wiring board 28 was covered by the speaker holder 44; however, it would also be possible to use a construction in which all of the wiring board 28 is covered by the speaker holder 44.

(5) In the above-mentioned embodiment, a case was described in which the case 14 was a body formed by joining a front surface case 16 and a back case 18; however, it would also be possible to use a construction in which a cover part is disposed on a single case.

A most preferred embodiment and the like of the present invention have been described above. However, the present invention is not limited to the above description; it goes without saying that various modifications and alterations may be made by a person skilled in the art on the basis of the gist of the invention that is described in the claims and disclosed in the detailed description of the invention, and that such modifications and alterations are included in the scope of the present invention.

The entire disclosure of Japanese Patent Application No. 2003-169821 including specification, claims, drawings and summary is incorporated herein by reference in its entirety.

What is claimed is:

1. A speaker supporting device which supports a speaker that is mounted in a case, comprising:
    a main body part which is installed in a wiring board disposed inside said case, covering a component mounted on said wiring board,
    wherein one side of said main body is provided with a space part which accommodates the mounted component, and the other side of said main body is provided with a mounting part which mounts said speaker; and
    the other side of said main body is provided with a resonant space part which is formed adjacent to said mounting part, said resonate space part extending toward said speaker, said resonant space part causing to resonate with a rear output of said speaker.

2. The speaker supporting device according to claim 1, wherein said main body part is a shielding member.

3. A speaker supporting device according to claim 1, wherein said resonant space is communicated with said mounting part at a rear part of said speaker.

4. The speaker supporting device according to claim 1, wherein a vibrator is mounted on said main body part.

5. The speaker supporting device according to claim 1, wherein said main body part is a synthetic resin or metal molded body.

6. An electronic device which has a speaker supporting device that supports a speaker mounted in a case, comprising:
    a main body part which is installed in a wiring board disposed inside said case, covering a component mounted on said wiring board,
    wherein one side of said main body is provided with a space part which accommodates the mounted component, and the other side of said main body is provided with a mounting part which mounts said speaker; and
    the other side of said main body is provided with a resonant space part which is formed adjacent to said mounting part, said resonate space part extending toward said speaker, said resonant space part causing to resonate with a rear output of said speaker.

7. The electronic device according to claim 6, wherein said main body part is a shielding member.

8. The electronic device according to claim 6, wherein said resonant space part is communicated with said mounting part at a rear part of said speaker.

9. The electronic device according to claim 6, wherein a vibrator is mounted on said main body part.

10. The electronic device according to claim 6, wherein said main body part is a synthetic resin or metal molded body.

* * * * *